United States Patent [19]

Schulte et al.

[11] Patent Number: 5,390,533
[45] Date of Patent: Feb. 21, 1995

[54] PRESSURIZING WITH AND RECOVERING HELIUM

[75] Inventors: Thomas R. Schulte, Grand Island; Carl J. Heim, Amherst; Vladimir T. Gorjaczkowski, Williamsville, all of N.Y.; Salvatore Giglia, Norwood, Mass.

[73] Assignee: Praxair Technology Inc., Danbury, Conn.

[21] Appl. No.: 262,298

[22] Filed: Jun. 20, 1994

Related U.S. Application Data

[60] Division of Ser. No. 49,776, Apr. 21, 1993, Pat. No. 5,344,480, which is a continuation-in-part of Ser. No. 880,071, May 5, 1992, abandoned.

[51] Int. Cl.$^6$ .......................... G01M 3/20; G01M 3/04
[52] U.S. Cl. ........................ 73/40.7; 73/49.2; 73/52; 73/40
[58] Field of Search .................. 73/40.7, 49.2, 52, 40

[56] References Cited

U.S. PATENT DOCUMENTS

| | | | |
|---|---|---|---|
| 3,675,468 | 7/1972 | Caccamesi et al. | 73/40.7 |
| 3,740,962 | 6/1973 | Fan | 62/29 |
| 3,815,376 | 6/1974 | Lofredo et al. | 62/22 |
| 4,675,030 | 6/1987 | Czarnecki et al. | 55/16 |
| 4,688,627 | 8/1987 | Jean-Luc et al. | 165/11.1 |
| 4,701,187 | 10/1987 | Choe et al. | 55/16 |
| 4,717,407 | 1/1988 | Choe et al. | 62/18 |
| 4,813,268 | 3/1989 | Helvey | 73/40.7 |
| 4,984,450 | 1/1991 | Burger | 73/40.7 |
| 5,172,583 | 12/1992 | Tallon | 73/40.7 |
| 5,224,350 | 7/1993 | Mehra | 62/17 |
| 5,309,752 | 5/1994 | Beckinghausen, Jr. et al. | 73/40.7 |

OTHER PUBLICATIONS

Umezu et al, "New Automatic Leak Testing System With Helium Mass Spectrometer Leak Detector", Journal of Vacuum Society of Japan, vol. 17, No. 2, 1974, pp. 45-52.

*Primary Examiner*—Hezron E. Williams
*Assistant Examiner*—J. David Wiggins
*Attorney, Agent, or Firm*—Stanley Ktorides

[57] ABSTRACT

A process and system for pressurizing a vessel for integrity testing with gas comprising helium, recovering the gas comprising helium, and purifying the gas comprising helium for reuse. The process for purifying the gas stream comprising helium comprises drying the gas stream; separating the dried gas stream in a membrane separator stage into a helium-enriched permeate product stream and a helium-depleted raffinate stream; recovering helium in the raffinate stream in a membrane stripper stage thereby producing a purge stream; and purging water from the dryer with the purge stream.

5 Claims, 5 Drawing Sheets

PRESSURIZING WITH AND RECOVERING HELIUM

PRESSURIZING WITH AND RECOVERING HELIUM

This application is a divisional of prior U.S. application Ser. No. 08/049,776, filed Apr. 21, 1993, which has now issued as U.S. Pat. No. 5,344,480, which was a continuation in part of prior U.S. application Ser. No. 07/880,071, filed May 5, 1992, which has now gone abandoned.

TECHNICAL FIELD

This invention relates to the detection of leaks in vessels, and particularly to the conservation and recovery of the gas used in the detection.

BACKGROUND OF THE INVENTION

Vessels intended to contain fluid may develop small leaks during manufacture, or at some time during their useful life. A leak may render the vessel unsuitable for its intended use. A leak may also result in unwanted pollutants entering the atmosphere. Accordingly, leak detectors and leak detection methods have been devised to detect the presence of small leaks so that the vessel may be repaired or replaced during the manufacturing process or in the field. Most commonly leaks are detected by pressurizing the vessel with a gas comprising a tracer gas, and then analyzing the ambient air at the surface of the vessel for the presence, and, in some cases, the concentration of the tracer gas.

A preferred tracer gas is helium due to its inertness, small molecular structure and high thermal conductivity which aids detection. Its small molecular structure permits it to easily pass through the smallest of leaks in a vessel and to be easily detected by instrumentation such as a mass spectrometer or thermal conductivity analyzer. However, the natural sources of helium on earth are limited, and its recovery and refinement are costly. Hence helium is costly and its conservation and recovery in repetitive leak detecting operations is well justified economically. With the recovery of helium effectuated, its use can economically be extended to other integrity testing of vessels, such as to pressure testing or pressure proving of vessels. As used herein, ascertaining the integrity of a vessel shall mean raising the pressure inside the vessel to a desired pressure thereby demonstrating that the vessel does not burst or develop a leak apparent to unaided human senses, or performing a leak detection upon the vessel using specialized equipment for the purpose of detecting leaks.

SUMMARY OF THE INVENTION

This invention provides a method of pressurizing a vessel for integrity testing with gas comprising helium, recovering the gas, and purifying the gas for reuse. The process for purification of gas comprising helium and air constituents comprises:

(a) drying the gas comprising helium and air constituents in a fluid stream dryer;

(b) separating the dried gas stream in a membrane separator stage into a helium-enriched permeate product stream and a helium-depleted raffinate stream;

(c) recovering helium in the raffinate stream in a membrane stripper stage thereby producing a purge stream; and (d) purging water from the dryer with the purge stream. The process may further comprise compressing the gas stream comprising helium and air constituents prior to drying the gas stream.

In one embodiment, the step of recovering helium from the raffinate stream in a membrane stripper stage comprises producing a permeate stream as a purge stream, and the method further comprises adding the purge stream after it has purged water from the dryer into the stream of gas comprising helium prior to compressing the gas stream. In another embodiment, the step of recovering helium from the raffinate stream in a membrane stripper stage comprises producing a raffinate stream as a purge stream, producing a helium-enriched permeate stream, and adding the helium-enriched permeate stream into the stream of gas comprising helium prior to compressing the gas stream.

The method for pressurizing a vessel for integrity testing with gas comprising helium comprises:

(a) communicating the vessel with a low pressure tank containing gas comprising helium at a pressure less than that desired for integrity testing of the vessel;

(b) admitting gas into the vessel from the low pressure tank;

(c) ceasing communication between the low pressure tank and the vessel;

(d) communicating the vessel with a high pressure tank containing gas comprising helium at a desired pressure for integrity testing of the vessel;

(e) admitting gas into the vessel from the high pressure tank;

(f) ceasing communication of the vessel with the high pressure tank;

(g) communicating the vessel with the low pressure tank;

(h) receiving gas from the vessel into the low pressure tank by pressure difference; and (i) ascertaining the integrity of the vessel during or after step (e) or (f).

In yet another embodiment, the invention includes means for selectively removing constituents other than helium from the gas entering, or in, the high pressure tank.

DETAILED DESCRIPTION OF THE PREFERRED EMBODIMENT

Figure 1:
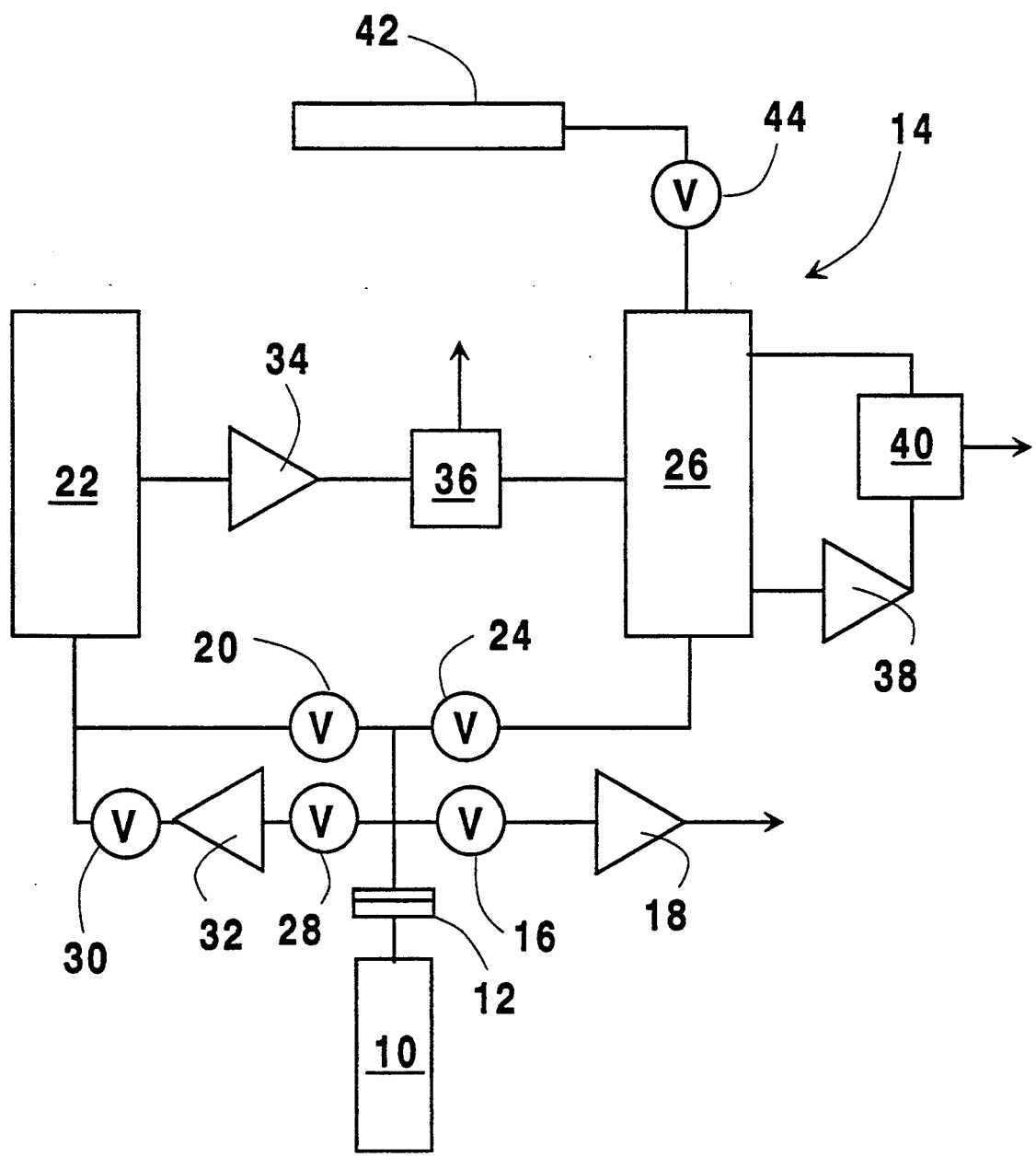
FIG. 1 is a schematic diagram of an system for pressurizing a vessel for integrity testing pursuant to this invention.

Referring to FIG. 1, the vessel 10 to be evaluated for integrity, that is for pressure capability or leakage, is connected by a coupling 12 to a pressurization and recovery system 14. Initially, by opening a valve 16, the vessel is communicated with a means for evacuating the vessel, typically a first vacuum pump 18. The vessel is at least partially evacuated of air and other volatile matter by the pump 18, typically to a pressure level of 1 torr absolute. The valve 16 to the first vacuum pump 18 is then closed. Optionally, however, the first vacuum pump 18 and its function may be omitted.

Subsequently, a valve 20 is opened to a low pressure tank 22 admitting gas into the vessel. The pressure in the low pressure tank 22 is in the range of from 0.5 to 350 kPa gauge, for example. The low pressure gas may be any gas or mixture of gases which are not deleterious to the vessel and includes or substantially comprises a tracer gas. The concentration of tracer gas in the low pressure gas is at least sufficient that the detection instrument used is capable of detecting leakage from the vessel by the presence of tracer gas in the ambient air at the vessel surface. Concentrations from 1 to 100% by volume are used. Helium is a preferred tracer gas, which may be used alone or in admixture, for example, with air or nitrogen. Other tracer gases such as fluorocarbons may be used.

After the pressure between the vessel 10 and the low pressure tank 22 has equalized, the valve leading to the low pressure tank 22 is closed. A valve 24 is opened communicating the vessel with a high pressure tank 26 and admitting gas from the high pressure tank into the vessel to a desired test pressure. The high pressure tank 26 also contains gas preferably containing helium in a concentration that the detection instrument used is capable of detecting its leakage, for example, from 1 to 100% by volume. The pressure of the gas in the high pressure tank 26 is sufficient that the vessel 10 can be pressurized to a desired test pressure, for example, from 70 to 4000 kPa gauge.

The pressure test of the vessel is performed usually by bringing the vessel to the desired test pressure. Communication of the vessel with the high pressure tank 26 is then ceased by closing the valve 24 thereto. While the vessel is at the high pressure, a leakage evaluation may be performed by passing the probe of a leak detector instrument over the surface of the vessel.

Next, the vessel 10 is directly communicated with the low pressure tank 22 by opening the valve 20 thereto, whereby gas from the vessel is received into the low pressure tank 22 by pressure difference. Preferably leaks are detected from the vessel while it is at this pressure level, for example, at 350 kPa gauge. Leak detection may be performed, however, at any pressure between the pressure of the high pressure tank and the pressure of the low pressure tank.

Direct communication of the vessel with the low pressure tank 22 is ceased by closing the valve 20 thereto. The vessel is then communicated with a means for pumping gas from the vessel to the low pressure tank 22, as by opening the valves 28 and 30 leading to a second vacuum pump 32 and thence to the low pressure tank 22. Gas is pumped from the vessel down to a low pressure of, for example, 1 torr absolute. The valves 28 and 30 leading to the second vacuum pump 32 are then closed, and the vessel 10 is disconnected from the pressurization and recovery system 14. Optionally, however, the second vacuum pump 32 and its function may be omitted.

Gas is pumped from the low pressure tank 22 to the high pressure tank 26 by a means such as a compressor 34. Preferably the gas entering the high pressure tank 26 from the compressor 34 passes through a means 36 for selectively removing constituents other than helium from the gas. A known means, such as a semi-permeable membrane, is employed. Optionally, the gas in the high pressure tank 26 is recirculated by a compressor 38 through a means 40 for selectively removing constituents other than helium from the gas. Optionally, the purification means, 36 and 40 could also be eliminated as the quantity of gas in the system 14 is depleted, the gas is replenished by admitting helium, or gas containing helium, into the system 14 from a supply storage tank 42 through a valve 44.

The leak detector used is a known device, such as a mass spectrometer or thermal conductivity meter through which a sample of air from the ambient around the vessel surface is drawn. The sample is introduced through a probe connected to the analyzer.

Figure 2:
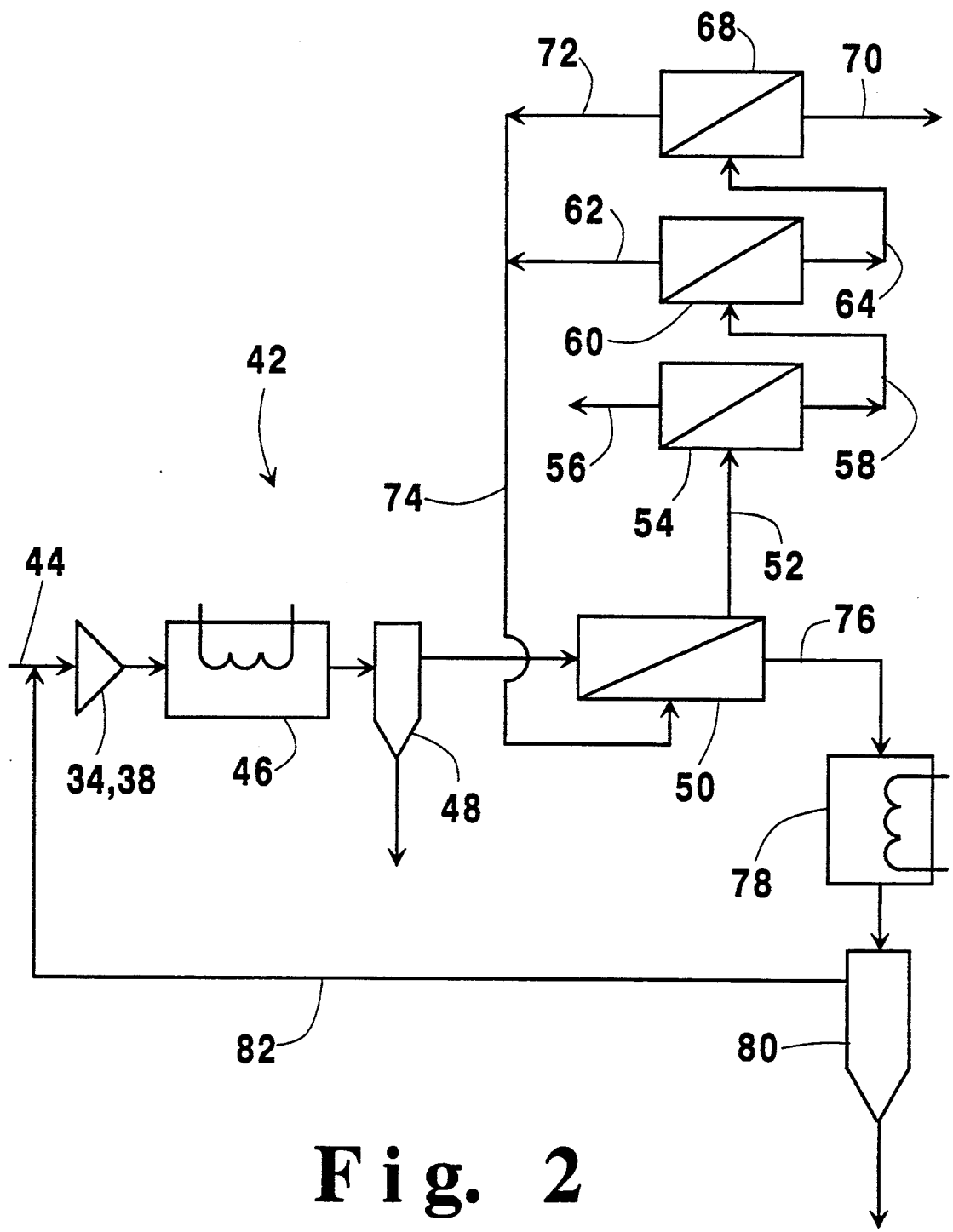
FIG. 2 is a schematic diagram of a system according to this invention for purifying helium used in the integrity testing pursuant to the system of FIG. 1.

While the means 36 for selectively removing constituents other than helium from the gas entering the high pressure tank, or the means 40 for selectively removing constituents other than helium from the gas in the high pressure tank 26 may be conventional means, the use of a novel helium purification system provided by this invention is preferable. FIG. 2 is directed to such a novel helium purification system 42. A helium gas stream 44 contaminated with constituents of air including water is pressurized in a compressor 34 or 38, the outlet of which discharges into an aftercooler 46 and subsequently into a water separator 48. The outlet of the water separator 48 discharges into the inlet of a dryer 50, which may be selected from various types. In the embodiment of FIG. 2, the dryer 50 is a membrane dryer such as described in U.S. Pat. No. 5,067,971, entitled "Process For Dehydration of Gases and Composite Permeable Membranes Therefor" issued Nov. 26, 1991 to B. Bikson, S. Giglia and J. K. Nelson. Water selectively permeates the membrane in the dryer 50 leaving a water-depleted raffinate stream 52 which discharges from the membrane dryer 50 via a port communicating with an inlet for receiving a stream containing helium in a membrane separator stage 54.

Helium selectively permeates the membrane in the membrane separator stage 54 producing a helium-enriched permeate product stream 56. The product stream 56 may be directed into the high pressure tank 26 of the system for integrity testing. The contaminants comprising air constituents do not permeate the membrane in the membrane separator stage 54 appreciably and produce a helium-depleted raffinate stream 58 which discharges from a raffinate outlet in the membrane separator stage 54.

The raffinate stream 58 enters the inlet to a first membrane stripper stage 60. Helium in the entering raffinate stream 58 selectively permeates the membrane producing a helium-enriched permeate stream 62. The contaminants comprising air constituents do not permeate the membrane appreciably and produce a helium-depleted raffinate stream 64 which discharges from a raffinate outlet in the membrane stripper stage 60.

The raffinate stream 64 from the first membrane stripper stage 60 enters a second membrane stripper stage 68. Contaminants comprising air constituents do not appreciably permeate the membrane and are discharged from the second membrane stripper stage 68 and from the system 42 via a raffinate outlet. Helium selectively permeates the membrane in the second membrane stripper stage 68 producing a helium-enriched permeate stream 72 which joins the helium-enriched permeate stream 62 from the first membrane stripper stage 60. Membrane material suitable for use in the membrane separator stage and the membrane stripper stages is described in U.S. Pat. No. 4,919,865 entitled "Composite Membranes of Poly (Methyl Methacrylate) Blends, Their Manufacture and Their Use" issued Apr. 24, 1990 to J. K. Nelson.

The combined permeate stream 74 has low moisture content and is suitable for regenerating the dryer 50. The combined raffinate stream 74 flows to a port in the dryer 50 for receiving a moisture-depleted purge stream. The membrane dryer 50 is regenerated by using the combined permeate stream 74 as a purge stream to sweep the permeate side of the membrane of water which has permeated thereby maintaining a concentration gradient and a rate of permeation of water across the membrane. The water-enriched purge stream 76 discharges from a dryer port on the permeate side of the dryer membrane.

Subsequently, the water-enriched purge stream 76 from the dryer is cooled in a cooler 78, condensed water is physically separated in a separator 80, and the purge stream 82 is directed to the compressor 34 for recycle to the helium purification system 42. Streams introduced into the membrane dryer 50, the separator stage 54 and the membrane stripper stages 60, 68 are typically at 310 K. The impure feed stream to the purification system, typically at a pressure of 820 kPa gauge, has a preferred operating pressure range of from about 700 kPa to about 950 kPa gauge. An example of other typical parameters for the streams is provided in the following table.

|  | Impure feed | Separator permeate | Stripper permeate | Stripper raffinate |
|---|---|---|---|---|
| Stream number | 44 | 56 | 74 | 70 |
| Flow rate | 100 | 72 | 25 | 3 |
| Helium, mol % | 95.5 | 99.8 | 98.1 | 32.8 |
| Nitrogen, mol % | 2.6 | 0.08 | 0.9 | 54.5 |
| Oxygen, mol % | 0.9 | 0.12 | 1.0 | 12.7 |
| Water, ppmv | 10,000 | 1. | 1. | 1. |
| Pres. kPa gage | 820 | 240 | 40 | 1 |

Figure 3:
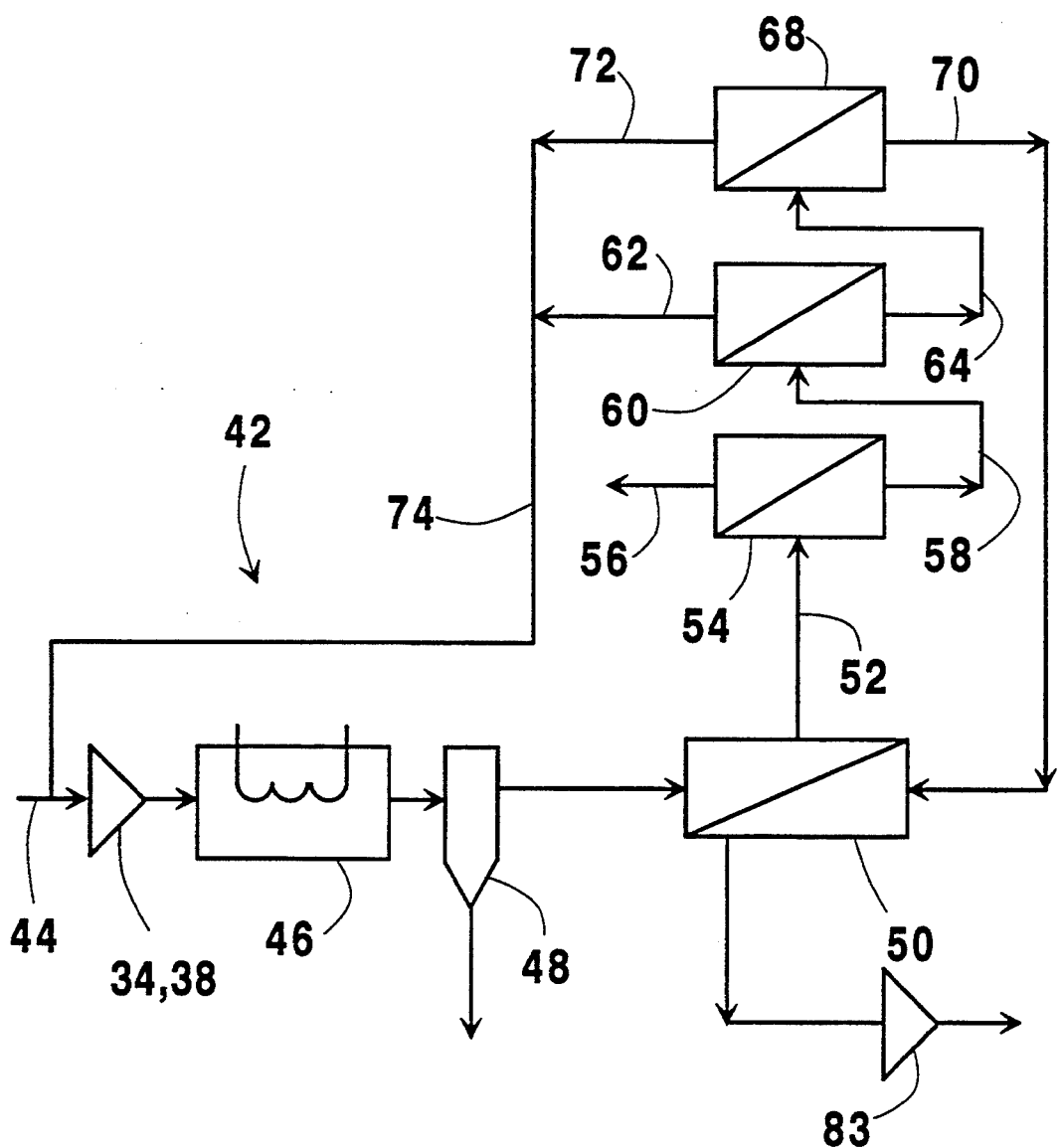
FIG. 3 is a schematic diagram of another embodiment of this invention for purifying a fluid stream of helium.

An alternate embodiment depicted in FIG. 3 employs components similar to the embodiment of FIG. 2, connected, however, in a somewhat different flow arrangement. The raffinate 70 from the second membrane stripper stage 68 has very low moisture content and is suitable for regenerating the dryer 50. The raffinate is directed to the dryer 50 to serve as a purge stream sweeping the permeate side of the membrane. The flow of the purge stream 70 through the dryer 50 and the removal of water from the permeate side of the dryer membrane may be enhanced by providing a vacuum pump 83 with its inlet connected to the raffinate outlet of the dryer. The flow from the vacuum pump 83 typically is vented to the atmosphere. In the embodiment depicted in FIG. 3, the combined permeate stream 74 from the first and second membrane stripper stages 60, 68 is directed to the inlet of the compressor 34, 38 for recycle in the helium purification system 42.

Figure 4:
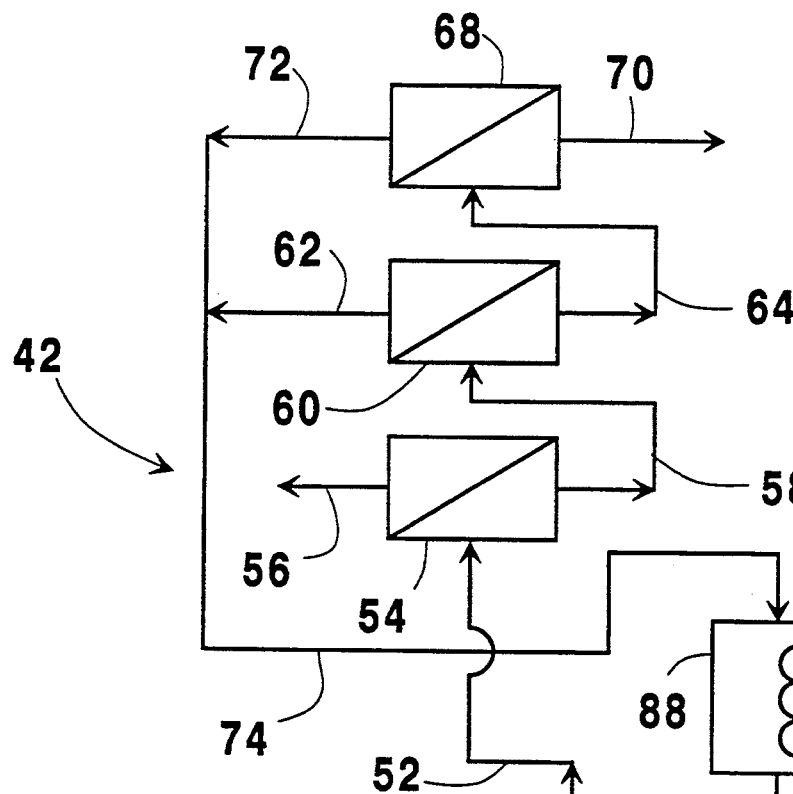
FIG. 4 is a schematic diagram of another embodiment of this invention for purifying a fluid stream of helium.
Figure 4:
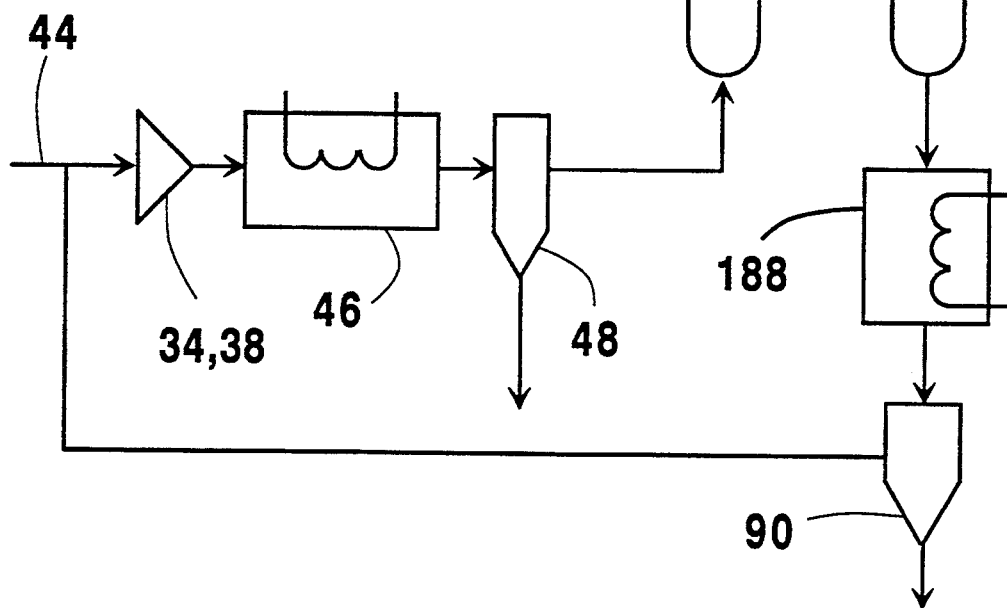

Another alternate embodiment depicted in FIG. 4 employs components and a flow arrangement similar to the embodiment of FIG. 2. However, the membrane dryer of FIG. 2 is replaced by a conventional adsorber dryer comprised of at least two switchable adsorbent beds. "One of the beds 84 is capable of drying the compressed feed stream containing helium gas while" the other bed 86 is regenerated by purge gas 74 comprised of the permeate streams from the first and second membrane stripper refining stages 60, 68. The combined purge stream is heated in a heater 88, passed through the adsorbent bed 86 being regenerated, cooled in a cooler 188, separated of water in a separator 90, and directed to the inlet of a compressor 34, 38 for recycle to the helium recovery system 42.

Figure 5:
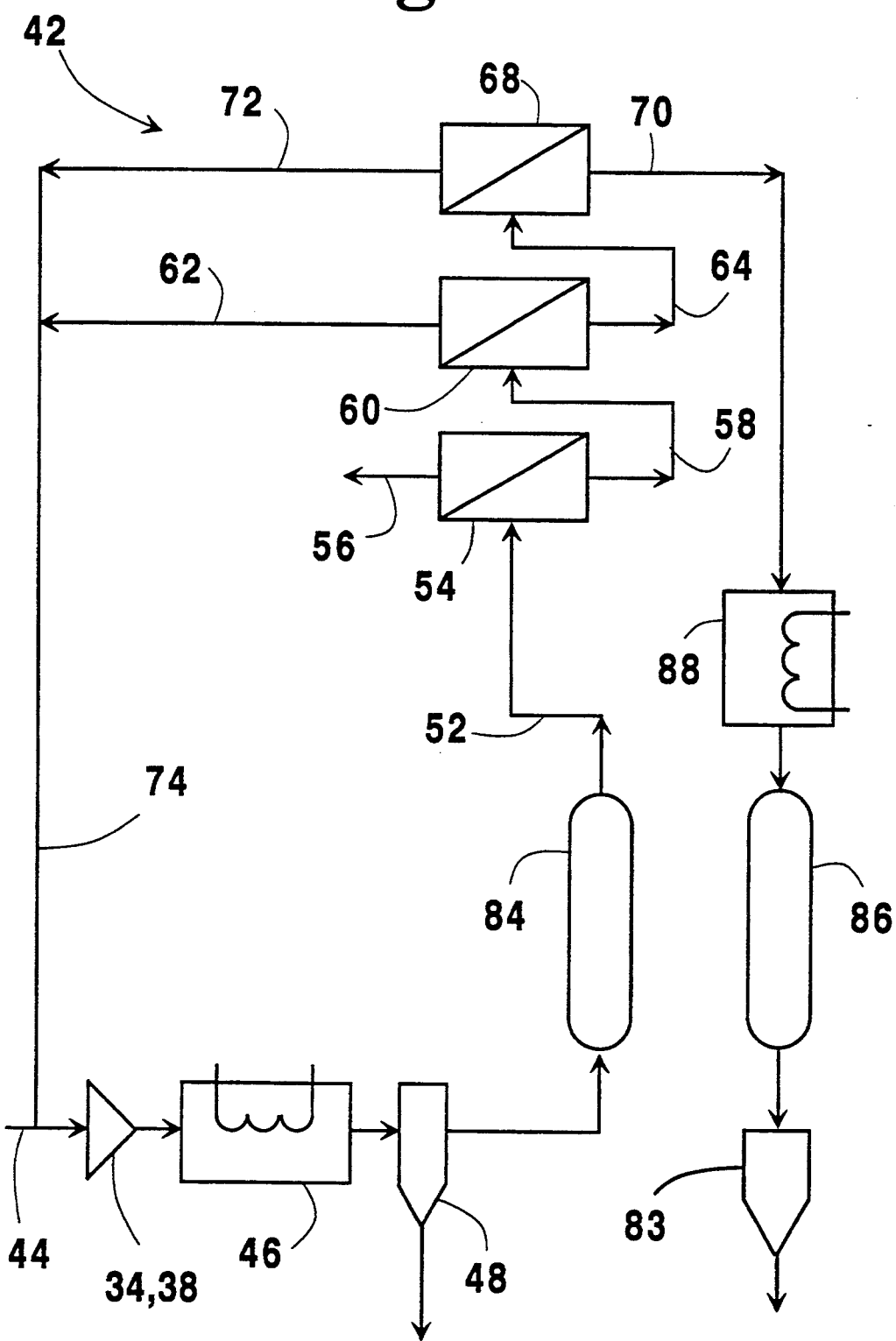
FIG. 5 is a schematic diagram of still another embodiment of this invention for purifying a fluid stream of helium.

Still another alternate embodiment depicted in FIG. 5 employs components and a flow arrangement similar to that of FIG. 3, except that a conventional adsorber dryer as described with respect to FIG. 4 replaces the membrane dryer of FIG. 3.

Although the invention has been described with reference to specific embodiments as examples, it will be appreciated that it is intended to cover all modifications and equivalents within the scope of the appended claims.

What is claimed is:

1. A method of pressurizing a vessel for integrity testing with gas comprising helium, and recovering helium for reuse, said method comprising:
   (a) communicating the vessel with a low pressure tank (at pressure exceeding vessel pressure) containing gas comprising helium at a pressure less than that desired for integrity testing of the vessel;
   (b) admitting gas into the vessel from said low pressure tank;
   (c) ceasing communication between said low pressure tank and the vessel;
   (d) communicating the vessel with a high pressure tank containing gas comprising helium at a desired pressure for integrity testing of the vessel;
   (e) admitting gas into the vessel from said high pressure tank;
   (f) ceasing communication of the vessel with said high pressure tank;
   (g) communicating the vessel with said low pressure tank;
   (h) receiving gas from the vessel into said low pressure tank by pressure difference; and
   (i) ascertaining the integrity of the vessel during or after step (e) or (f).

2. The method of pressurizing a vessel for integrity testing as in claim 1 further comprising a preliminary purging step of initially evacuating the vessel.

3. The method of pressurizing a vessel for integrity testing as in claim 1 further comprising after additional helium recovery step (h) the step of transferring gas from the vessel into said low pressure tank by vacuum pumping means.

4. The method of pressurizing a vessel for integrity testing as in claim 14 further comprising a purification step of selectively removing constituents other than helium from the gas entering, or stared in, said high pressure tank.

5. The method of pressurizing a vessel for integrity testing as in claim 1 further comprising a purification and dessication process for selectivity removing constituents other than helium from the gas stream entering, or a gas stream drawn from said high pressure tank, said process comprising:
   (j) compressing said stream of gas;
   (k) drying said compressed stream of gas in a fluid stream dryer;
   (l) separating said stream of gas in a membrane separator stage into a helium-enriched permeate product stream and a helium-depleted raffinate stream;
   (m) recovering helium from said raffinate stream in a membrane stripper stage thereby producing a purge stream; and
   (n) purging water from said dryer with said purge stream.

* * * * *

UNITED STATES PATENT AND TRADEMARK OFFICE
CERTIFICATE OF CORRECTION

PATENT NO. : 5,390,533

DATED : February 21, 1995

INVENTOR(S) : Thomas R. Schulte, et al.

It is certified that error appears in the above-identified patent and that said Letters Patent is hereby corrected as shown below:

In column 5, line 46, insert --70-- after "raffinate" and before "is".

In column 5, lines 63 and 64, delete the quotation marks.

In the Claims

Col. 6, line 47, delete "14" and insert therefor --1-- line 49, delete "stared" and insert therefor --stored--

Signed and Sealed this

Sixteenth Day of May, 1995

Attest:

BRUCE LEHMAN

Attesting Officer

Commissioner of Patents and Trademarks